US012368994B2

(12) United States Patent
Lacroix et al.

(10) Patent No.: US 12,368,994 B2
(45) Date of Patent: Jul. 22, 2025

(54) ELECTRONIC PROCESSING DEVICE AND PROCESSING METHOD, ASSOCIATED ACOUSTIC APPARATUS AND COMPUTER PROGRAM

(71) Applicant: ELNO, Argenteuil (FR)

(72) Inventors: Arthur Henri Lacroix, Frémécourt (FR); Clément Jean-Baptiste Albert, Colombes (FR); Mathieu Clément Nicolas Dexheimer, Joinville le Pont (FR); Thierry Pierre François Gaiffe, Saint Germain en Laye (FR)

(73) Assignee: ELNO, Argenteuil (FR)

( * ) Notice: Subject to any disclaimer, the term of this patent is extended or adjusted under 35 U.S.C. 154(b) by 244 days.

(21) Appl. No.: 18/202,240

(22) Filed: May 25, 2023

(65) Prior Publication Data

US 2023/0388704 A1 Nov. 30, 2023

(30) Foreign Application Priority Data

May 30, 2022 (FR) ................................. FR 2205151

(51) Int. Cl.
*H04R 3/00* (2006.01)
*G10L 25/78* (2013.01)
*H04R 1/46* (2006.01)

(52) U.S. Cl.
CPC .............. *H04R 3/005* (2013.01); *G10L 25/78* (2013.01); *H04R 1/46* (2013.01); *H04R 2460/13* (2013.01)

(58) Field of Classification Search
CPC .............. H04R 3/00; H04R 1/46; G10L 25/78
USPC .......................... 381/92, 71.1, 73.1, 94.1, 13
See application file for complete search history.

(56) References Cited

U.S. PATENT DOCUMENTS 10,741,164 B1 * 8/2020 Honda ............. G10K 11/17853
2014/0270231 A1 9/2014 Dusan et al.
2021/0044882 A1 * 2/2021 Jain ...................... G10K 11/178
2021/0195335 A1 * 6/2021 Margalit ................. H04S 1/005
2022/0150627 A1 5/2022 Zhou et al.

FOREIGN PATENT DOCUMENTS

FR 3019422 B1 7/2021

OTHER PUBLICATIONS

French Application No. 22 05151, Search Report dated Jan. 12, 2023, 2 pages.

* cited by examiner

*Primary Examiner* — Thjuan K Addy
(74) *Attorney, Agent, or Firm* — Soquel Group LLC

(57) ABSTRACT

The electronic processing device for an acoustic apparatus including a first air conduction microphone and a second bone conduction microphone, configured for being connected to the first and second microphones, for receiving as inputs the first and respectively second analog signals from the first, and respectively second microphones and for delivering as output a corrected signal.

The processing device comprises:

a hybridization module configured for calculating a hybrid signal from the first and second analog signals;

an estimation module configured for estimating noise in the hybrid signal;

a noise reduction module configured for calculating the corrected signal by applying a generalized spectral subtraction algorithm to the hybrid signal and according to the estimated noise.

14 Claims, 8 Drawing Sheets

ELECTRONIC PROCESSING DEVICE AND PROCESSING METHOD, ASSOCIATED ACOUSTIC APPARATUS AND COMPUTER PROGRAM

CROSS-REFERENCE TO RELATED APPLICATIONS

This application is a U.S. non-provisional application claiming the benefit of French Application No. 22 05151, filed on May 30, 2022, which is incorporated herein by reference in its entirety.

FIELD

The present invention relates to an electronic processing device for an acoustic apparatus.

The invention also relates to an acoustic apparatus comprising a first microphone comprising an electroacoustic transducer adapted to receive acoustic sound waves from a sound signal coming from the vocal cords of a user and to convert said acoustic waves into a first analog signal; a second microphone including a bone-mechanically excited transducer adapted to receive vibratory oscillations of said sound signal by bone conduction and to transform said vibratory oscillations into a second analog signal; such an electronic processing device being connected to the first and the second microphones, the processing device being configured for receiving the first and the second analog signals as input, and then to deliver a corrected signal as output.

The electronic processing device comprises a hybridization module configured for calculating a hybrid signal from the first and the second analog signals.

The invention also relates to a processing method implemented by such an electronic processing device; and to a non-transitory computer-readable medium including a computer program including software instructions which, when executed by a computer, implements such processing method.

BACKGROUND

An acoustic apparatus of the above-mentioned type is known from the document FR 3 019 422 B1. The acoustic apparatus comprises the first microphone with such an electroacoustic transducer, also called an air conduction transducer; the second microphone with such a bone-mechanically excited transducer, also called a structure-borne noise transducer; means for calculating a corrected electrical signal according to the first electrical signal and the second electrical signal, the corrected electrical signal being adapted to be delivered at the output of the acoustic apparatus; and a noise reduction apparatus connected to the output of the electroacoustic transducer for reducing the noise in the first electrical signal; the calculation means being connected to the output of the noise reduction apparatus and to the output of the bone-mechanically excited transducer.

However, with such an acoustic apparatus, noise reduction is not always optimal, and relatively high background noise sometimes remains in the signal delivered at the output of the acoustic apparatus.

SUMMARY

The aim of the invention is then to propose an electronic processing device, and an associated processing method, which can be used for further improving the reduction of noise in the signal delivered at the output of the acoustic apparatus, i.e. to reduce the presence of noise in said signal.

To this end, the subject matter of the invention is an electronic processing device for an acoustic apparatus,

- the acoustic apparatus comprising a first microphone including an electroacoustic transducer adapted to receive acoustic sound waves of a sound signal from a user's vocal chords and to transform said acoustic waves into a first analog signal; and a second microphone including a bone-mechanically excited transducer adapted to receive vibratory oscillations of said sound signal by bone conduction and to transform said vibratory oscillations into a second analog signal,
- the electronic processing device being configured for being connected to the first and second microphones, to receive as input the first and second analog signals and to output a corrected signal,
- the electronic processing device comprising:
  - a hybridization module configured for calculating a hybrid signal from the first and the second analog signals;
  - an estimation module connected to the hybridization module and configured for estimating noise in the hybrid signal; and
  - a noise reduction module connected to the hybridization module and to the estimation module, the noise reduction module being configured for calculating the corrected signal by applying a generalized spectral subtraction algorithm to the hybrid signal, according to the estimated noise.

With the electronic processing device according to the invention, the fact of estimating the noise in the hybrid signal calculated from the first and the second analog signals, i.e. in the hybrid signal obtained from the signals coming from the electroacoustic, or air conduction, transducer, and the bone-mechanically excited transducer, also called bone conduction transducer, or structure-borne noise transducer, can be used for a more accurate estimation of the noise, then for obtaining obtain—via the noise reduction module

- a better corrected signal by applying the generalized spectral subtraction algorithm to the hybrid signal and depending on the noise thereby estimated.

Preferentially, the hybrid signal includes a plurality of successive segments, each segment corresponding to the hybrid signal during a period of time, and the processing device further includes a voice activity detection module adapted to determine whether or not each segment of the hybrid signal includes the presence of a voice, the estimation module being then configured for estimating the noise in the hybrid signal only from each segment without any voice.

Preferentially, the presence or absence of voice is determined from the second signal from the bone conduction transducer, and the presence or absence of voice is better detectable in a signal coming from a bone conduction microphone, rather than in a signal coming from an air conduction microphone.

According to other advantageous aspects of the invention, the electronic processing device comprises one or a plurality of the following features, taken individually or according to all technically possible combinations:

- the hybrid signal includes a plurality of successive segments, and the device further comprises a voice activity detection module connected to the hybridization module and configured for determining the presence of voice or the absence of voice in each segment of the hybrid signal; the estimation module then being configured for estimating the noise in the hybrid signal according to each segment with a determined absence of voice;

the voice activity detection module is configured for determining the presence of voice or the absence of voice from the second signal from the bone-mechanically excited transducer;

the voice activity detection module being preferentially configured for determining the presence of voice or the absence of voice only from the second signal, regardless of the first signal;

the second signal includes a plurality of successive segments, and the voice activity detection module is configured for calculating an RMS value for each segment of the second signal, and then for determining the presence of voice or absence of voice based on respective RMS value(s);

the voice activity detection module is configured for determining the presence of voice or the absence of voice according to an average value of M last calculated RMS value(s) and/or a change in RMS value between a current RMS value and a preceding RMS value, M being an integer greater than or equal to 1;

the voice activity detection module being preferentially configured for determining the presence of voices if said average value is greater than or equal to a predefined average threshold or if said RMS value variation is greater than or equal to a predefined variation threshold;

the hybridization module is configured for converting the first analog signal into a first digital signal, as the first analog signal is received, and for generating successive first segments from the first digital signal, each new first segment generated including samples of a preceding first segment and new samples of the first digital signal; and the hybridization module is configured for converting the second analog signal into a second digital signal as the second analog signal is received, and for generating successive second segments from the second digital signal, each new second segment generated including samples of a preceding second segment and new samples of the second digital signal;

hybrid segments of the hybrid signal then being progressively calculated from the first and the second segments generated; the corrected signal is then calculated from said hybrid segments;

the hybridization module is configured for obtaining a first filtered signal by applying to the first signal, a first filter associated with a first frequency range; for obtaining a second filtered signal by applying to the second signal, a second filter associated with a second frequency range; then for calculating the hybrid signal by summing the first filtered signal and the second filtered signal, the second frequency range being distinct from the first frequency range;

the first frequency range preferentially includes frequencies higher than the frequencies of the second frequency range;

the first and the second frequency ranges being preferentially still disjoint.

The invention further relates to an acoustic apparatus comprising:

a first microphone including an electroacoustic transducer adapted to receive acoustic sound waves from a sound signal coming from the vocal cords of a user and to convert said acoustic waves into a first analog signal;

a second microphone including a bone-mechanically excited transducer adapted to receive vibratory oscillations of said sound signal by bone conduction and to transform said vibratory oscillations into a second analog signal;

an electronic processing device connected to the first and the second microphones, the electronic processing device being configured for receiving the first and the second analog signals as input, then for delivering a corrected signal as output; the electronic processing device being as defined hereinabove.

According to another advantageous aspect of the invention, the acoustic apparatus further comprises two lateral acoustic modules resting on the lateral flanks of the skull and suitable for transmitting a sound signal to the auditory nerve.

The invention further relates to head fitted equipment for an operator, comprising a protective helmet, and an acoustic apparatus as defined herein.

A further subject matter of the invention is a processing method, the method being implemented by an electronic processing device connected to first and second microphones, the first microphone including an electroacoustic transducer adapted to receive acoustic sound waves from a sound signal from the vocal cords of a user and to convert said acoustic waves into a first analog signal; and the second microphone including a bone-mechanically excited transducer adapted to receive vibratory oscillations of said sound signal by bone conduction and to transform said vibratory oscillations into a second analog signal, the electronic processing device being configured for receiving as input, the first and the second analog signals and for delivering a corrected signal as output, the processing method comprising:

a hybridization step including the calculation of a hybrid signal from the first and the second analog signals;

a step of estimating noise in the hybrid signal; and a noise reduction step including the calculation of the corrected signal by applying a generalized spectral subtraction algorithm to the hybrid signal and according to the estimated noise.

The invention further relates to a non-transitory computer-readable medium including a computer program including software instructions which, when executed by a computer, implement the processing method as defined hereinabove.

BRIEF DESCRIPTION OF THE DRAWINGS

Such features and advantages of the invention will become clearer upon reading the following description, given only as a non-limiting example, and made with reference to the enclosed drawings, wherein.

DETAILED DESCRIPTION

The expression "substantially equal to" defines a relation of equality within plus or minus 10%, preferentially still within plus or minus 20%, more preferentially still within plus or minus 5%.

Figure 1:
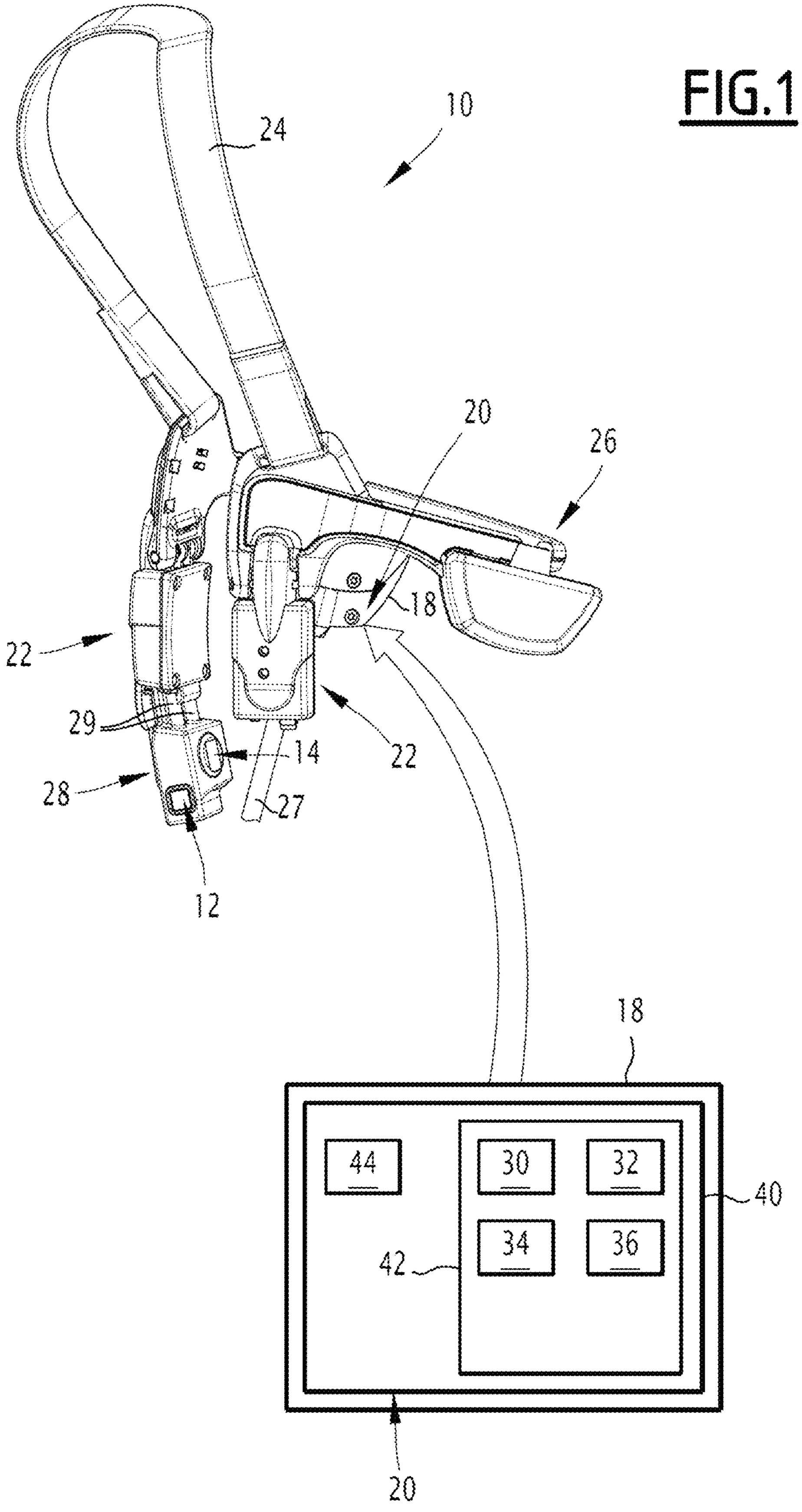
FIG. 1 is an overall perspective view of an acoustic apparatus according to the invention, the acoustic apparatus comprising a first air conduction microphone, a second bone conduction microphone, and an electronic processing device for delivering an electrical signal corrected from the electrical signals coming from the first and the second microphones.

In FIG. 1, an acoustic apparatus 10 comprises a first microphone 12, also called an air conduction microphone, adapted to receive acoustic sound waves and to convert same into a first electrical signal, such as a first analog signal, and a second microphone 14, also called a bone conduction microphone or structure-borne noise microphone, adapted to receive vibratory oscillations through bone conduction and convert same into a second electrical signal, such as a second analog signal.

The acoustic apparatus 10 comprises a protective housing 18 and a processing device 20 arranged inside the protective housing 18, the processing device 20 being connected to the first microphone 12 and to the second microphone 14, and configured for receiving as input the first and the second analog signals and for delivering as output a corrected signal in which noise has been reduced.

In addition, the acoustic apparatus 10 further comprises two lateral acoustic modules 22, an upper arch 24, a rear arch 26 for connecting the acoustic modules and a connection cable 27, the connection cable 27 being equipped with a connector (not shown) at the end thereof. The lateral acoustic modules 22, the upper arch 24, the rear arch 26 and the connection cable 27 are known per se, e.g. from the document FR 3 019 422 B1.

The first microphone 12 is known, e.g. from the document FR 3 019 422 B1, and includes an electroacoustic transducer (not shown) adapted to receive acoustic sound waves from a sound signal coming from the vocal cords and to convert said acoustic waves into the first electrical signal. The first microphone 12 is connected to the input of the processing device 20.

The second microphone 14 is also known, e.g. from the document FR 3 019 422 B1, and includes a bone-mechanically excited transducer adapted to receive, through bone conduction, in particular through a corresponding bone of the skull, the vibratory waves of the sound signal coming from the vocal cords of the user and to convert same into the second electrical signal. The bone-mechanically excited transducer is also called a bone conduction transducer, or a structure-borne noise transducer. The second microphone 14 is also connected to the input of the processing device 20.

In the example shown in FIG. 1, the first microphone 12 and the second microphone 14 are not arranged in the protective housing 18, but are arranged in an additional housing 28, the additional housing 28 being connected by two connecting arms 29 to one of the two acoustic modules 22. The electroacoustic transducer and bone-mechanically excited transducer are then each arranged in the additional housing 28. The additional housing 28 is preferentially intended for being applied in contact with the right-hand side of the skull of the user, and is then preferentially connected to the right-hand acoustic module 22.

In a variant, as illustrated in the example shown in FIG. 13 of document FR 3 019 422 B1, the second microphone 14 is not arranged in the protective housing 18, but is arranged in another additional housing, the other additional unit being connected by two connecting arms to one of the two acoustic modules 22. The bone-mechanically excited transducer of the second microphone is then arranged in the other additional housing. The other additional housing is preferentially intended for being applied in contact with the right-hand side of the users skull and is then preferentially connected to the right-hand acoustic module 22.

In a further variant, as illustrated in the example shown in FIG. 1 of document FR 3 019 422 B1, the first microphone 12 includes a protuberance, e.g. integral with the protective housing 18. According to such variant, the second microphone 14, in particular its bone-mechanically excited transducer, is arranged inside the protective housing 18.

Figure 2:
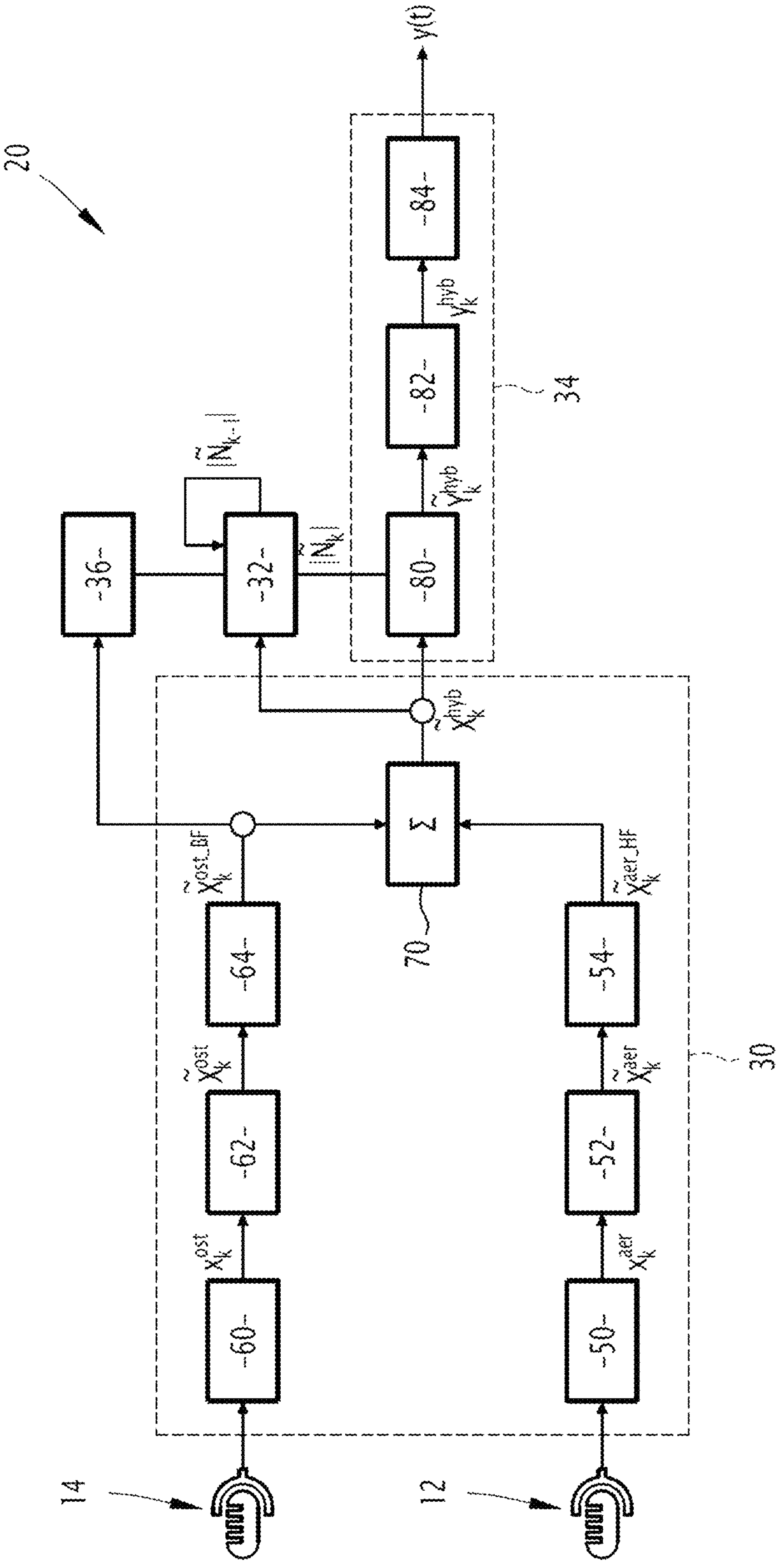
FIG. 2 is a synopsis schematic representation of the processing device shown in FIG. 1, connected to the first air conduction microphone and to the second bone conduction microphone.

The electronic processing device 20 comprises a hybridization module 30 connected to the first microphone 12 and to the second microphone 14; an estimation module 32 connected to the hybridization module 30; and a noise reduction module 34 connected to the hybridization module 30 and to the estimation module 32, as shown in FIG. 2.

As an optional addition, the electronic processing device 20 further comprises a voice activity detection module 36 connected to the hybridization module 30.

In the example shown in FIG. 1, the electronic processing device 20 comprises an information processing unit 40 consisting e.g. of a memory and of a processor 44 associated with the memory 42.

In the example shown in FIG. 1, the hybridization module 30, the estimation module 32, the noise reduction module 34, and, as an optional addition, the voice activity detection module 36 are each produced in the form of a software program, or a software brick, which can be run by the processor 44. The memory 42 of the processing device 20 is then adapted to store a software program for hybridizing the first and the second analog signals into a hybrid signal, a software program for estimating the noise in the hybrid signal, and a software program for reducing the noise in the hybrid signal, as well as an optional addition, a software for detecting voice activity in the hybrid signal. The processor 44 is then adapted to execute each of the software programs among the hybridization software program, the estimation software program and the noise reduction software program as well as, optionally, the voice activity detection software program.

In a variant (not shown), the hybridization module 30, the estimation module 32, the noise reduction module 34 and, as an optional addition, the voice activity detection module 36 are each produced in the form of a programmable logic component, such as an FPGA (Field Programmable Gate Array), or further of integrated circuit, such as an ASIC (Application Specific Integrated Circuit).

When the electronic processing device 20 is produced in the form of one or a plurality of software programs, i.e. in the form of a computer program, same is further adapted for being recorded on a computer-readable medium (not shown). The computer-readable medium is e.g. a medium adapted to store the electronic instructions and to be coupled to a bus of a computer system. As an example, the readable medium is an optical disk, a magneto-optical disk, a ROM memory, a RAM memory, any type of non-volatile memory (e.g. EPROM, EEPROM, FLASH, NVRAM), a magnetic card or an optical card. A computer program containing software instructions is then stored on the readable medium.

The hybridization module 30 is configured for calculating the hybrid signal from the first and the second analog signals.

The hybridization module 30 is configured, e.g., for obtaining a first filtered signal by applying to the first signal, a first filter associated with a first frequency range; for obtaining a second filtered signal by applying to the second signal, a second filter associated with a second frequency range; the hybrid signal is then calculated by summing the first filtered signal and the second filtered signal, the second frequency range being distinct from the first frequency range.

The first frequency range typically includes frequencies higher than the frequencies of the second frequency range; the first and the second frequency ranges being e.g. disjoint.

The first filter is typically a high-pass filter with a cut-off frequency $f_c$ substantially equal to 1000 Hz, the high-pass filter being e.g. a Gaussian high-pass filter. The second filter is typically a low-pass filter with a cut-off frequency also substantially equal to 1000 Hz, the low-pass filter being e.g. a Gaussian low-pass filter. In other words, the first frequency range is then the range of frequencies greater than 1000 Hz, and the second frequency range is the range of frequencies less than 1000 Hz.

In addition, the hybridization module 30 is configured for converting the first analog signal into a first digital signal as and when the first analog signal is received, and for generating successive first segments from the first digital signal.

According to such addition, the hybridization module 30 is also configured for converting the second analog signal into a second digital signal, as and when the second analog signal is received, and for generating successive second segments from the second digital signal.

According to such optional addition, the hybridization module 30 is then configured for progressively calculating hybrid segments of the hybrid signal, from the first and the second segments generated; the corrected signal then being calculated from said hybrid segments.

In the example shown in FIG. 2, the hybridization module 30 includes a first analog-to-digital converter 50, connected to the first air conduction microphone 12 and configured for converting the first analog signal coming from the first microphone 12 into a first digital signal $x_k^{aer}$, with a sampling frequency $f_e$, e.g., substantially equal to 22 kHz. In addition, the first analog-to-digital converter 50 is configured for dividing the first digital signal $x_k^{aer}$, converted and sampled, into successive first segments, each first segment comprising e.g. a number N of samples. The number N of samples in each first segment is e.g. substantially equal to 512. A person skilled in the art will then observe that with the sampling frequency $f_e$ substantially equal to 22 kHz and the number N of samples substantially equal to 512, the duration of each first segment is approximately 20 ms, and typically substantially equal to 23 ms In the example shown in FIG. 2, the hybridization module 30 further includes a first time-to-frequency converter 52, connected to the output of the first analog-to-digital converter 50 and configured for calculating a first spectrum $\tilde{X}_k^{aer}$ of the first digital signal $x_k^{aer}$, typically via a Fourier transform, such as a Fast Fourier Transform, also known as FFT. The hybridization module 30 then includes a first filter unit 54, connected to the output of the first time-to-frequency converter 52 and configured for applying the first filter, typically the Gaussian high-pass filter with a cut-off frequency $f_c$ substantially equal to 1000 Hz, so as to obtain the first filtered signal $\tilde{X}_k^{aer_{HF}}$.

In the example shown in FIG. 2, the hybridization module 30 includes a second analog-to-digital converter 60, connected to the second bone conduction microphone 14 and configured for converting the second analog signal coming from the second microphone 14 into a second digital signal $x_k^{ost}$, with the sampling frequency $f_e$. In addition, the second analog-to-digital converter 60 is configured for cutting the second digital signal $x_k^{ost}$, converted and sampled, into successive second segments, each second segment comprising e.g., the number N of samples. A person skilled in the art will then observe that with the sampling frequency $f_e$ substantially equal to 22 kHz and the number N of samples substantially equal to 512, the duration of each second segment is approximately 20 ms, and typically substantially equal to 23 ms In the example shown in FIG. 2, the hybridization module 30 further includes a second time-to-frequency converter 62, connected to the output of the second analog-to-digital converter 60 and configured for calculating a second spectrum $\tilde{X}_k^{ost}$ of the second digital signal $x_k^{ost}$, typically via a Fourier Transform, such as Fast Fourier Transform, or FFT. The hybridization module 30 then includes a second filter unit 64, connected to the output of the second time-to-frequency converter 62 and configured for applying the second filter, typically the Gaussian low-pass filter with a cut-off frequency $f_c$ substantially equal to 1000 Hz, so as to obtain the second filtered signal $\tilde{X}_k^{ost_{BF}}$.

By convention, in the present description, for a signal denoted by x, the continuous form in time thereof is denoted by x(t), and the discretized form thereof is denoted by x[n] where n is a natural integer, n then forming a variable representing the discretized time. In the frequency domain, m represents the discrete frequency variable, between 0 and N/2, where N represents the number of samples per segment, e.g. equal to 512.

The discretized form of each signal then satisfies the following equation:

$$x[n]=x(n\times T_e) \quad [1]$$

where n is the integer variable representing the discretized time, and $T_e$ is a time discretization step satisfying the following equation:

$$T_e = \frac{1}{f_e} \quad [2]$$

where $f_e$ is the sampling frequency, e.g. substantially equal to 22 kHz.

The discrete frequency variable m is typically associated with a frequency vector f[m] satisfying the following equation:

$$f[m] = m \times \frac{f_e}{N} \quad [3]$$

where N is the number of samples in a segment,
m is the discrete frequency variable, and
$f_e$ is the sampling frequency.

The frequency then typically varies between 0 Hz and $f_e/2$ Hz, with a frequency step equal to $f_e/N$.

By convention, the $k^{th}$ segment of the signal x is denoted by $x_k$ or $x_k[n]$, and $\tilde{X}_k[m]$ in the frequency domain with:

$$\tilde{X}_k[m] = FFT(x_k[n]) \quad [4]$$

where FFT represents the digital operator for estimating the discrete Fourier Transform of a signal, e.g. implemented via the respective time-to-frequency converter 52, 62.

The spectral subtraction describes further the requirement of working only on the amplitude spectrum of the signal, the phase being conserved and unchanged throughout the process, with $|\widetilde{X_k}[m]|$ representing the amplitude spectrum and $\varphi(\widetilde{X_k}[m])$ representing the phase spectrum of $x_k[n]$, respectively. By convention, the spectrum (without any other precision) will refer thereafter to the amplitude spectrum.

In the example shown in FIG. 2, the hybridization module 30 further include a summing system 70, also called an adder, connected at the output of the first filter unit 54 and of the second filter unit 64, and configured for summing the first filtered signal $\tilde{X}_k^{aer_{HF}}$ and the second filtered signal $\tilde{X}_k^{ost_{BF}}$ to obtain the hybrid signal $\tilde{X}_k^{hyb}$.

The hybridization module 30 is then configured e.g. for calculating the hybrid signal $\tilde{X}_k^{hyb}$ by summing the first filtered signal $\tilde{X}_k^{aer_{HF}}$ and the second filtered signal $\tilde{X}_k^{ost_{BF}}$ via the following equation:

$$\tilde{X}_k^{hyb} = \alpha\tilde{X}_k^{aerHF} + \beta\tilde{X}_k^{ostBF} \quad [5]$$

where $\alpha$ and $\beta$ are constants.

The values of the constants $\alpha$ and $\beta$ are preferentially adjustable, making it possible to have an output signal at an equivalent level to the input signal of the first air conduction microphone 12. Furthermore, in this way it is possible to give a possible preponderance to the air conduction signal, or to the bone conduction signal, respectively.

As an optional addition, the hybridization module 30 is configured, during the generation of the first successive segments, for generating each new first segment with samples of a preceding first segment and new samples of the first digital signal.

According to such optional addition, the hybridization module 30 is configured in a similar manner, during the generation of the successive second segments, for generating each new second segment with samples from a preceding second segment and new samples from the second digital signal.

There is then an overlap between the first successive segments thus generated, i.e. from a first segment generated to the next; and similarly between the second successive segments thus generated, i.e. from a second segment generated to the next.

An overlap ratio then corresponds to a ratio, within each new first segment, between the number of samples from the preceding first segment used and the total number of samples from the first segment, i.e. the new first segment generated; or to the ratio, within each new second segment, between the number of samples from the preceding second segment used and the total number of samples from the second segment, respectively. The overlap rate is e.g. comprised between 50% and 75%, i.e. between 0.5 and 0.75. In other words, within each new first segment, between half and three-quarters of the last samples from the preceding first segment are used; and similarly within each new second segment, between half and three-quarters of the last samples from the preceding second segment are used. The overlap between segments is illustrated in FIG. 3.

Figure 3:
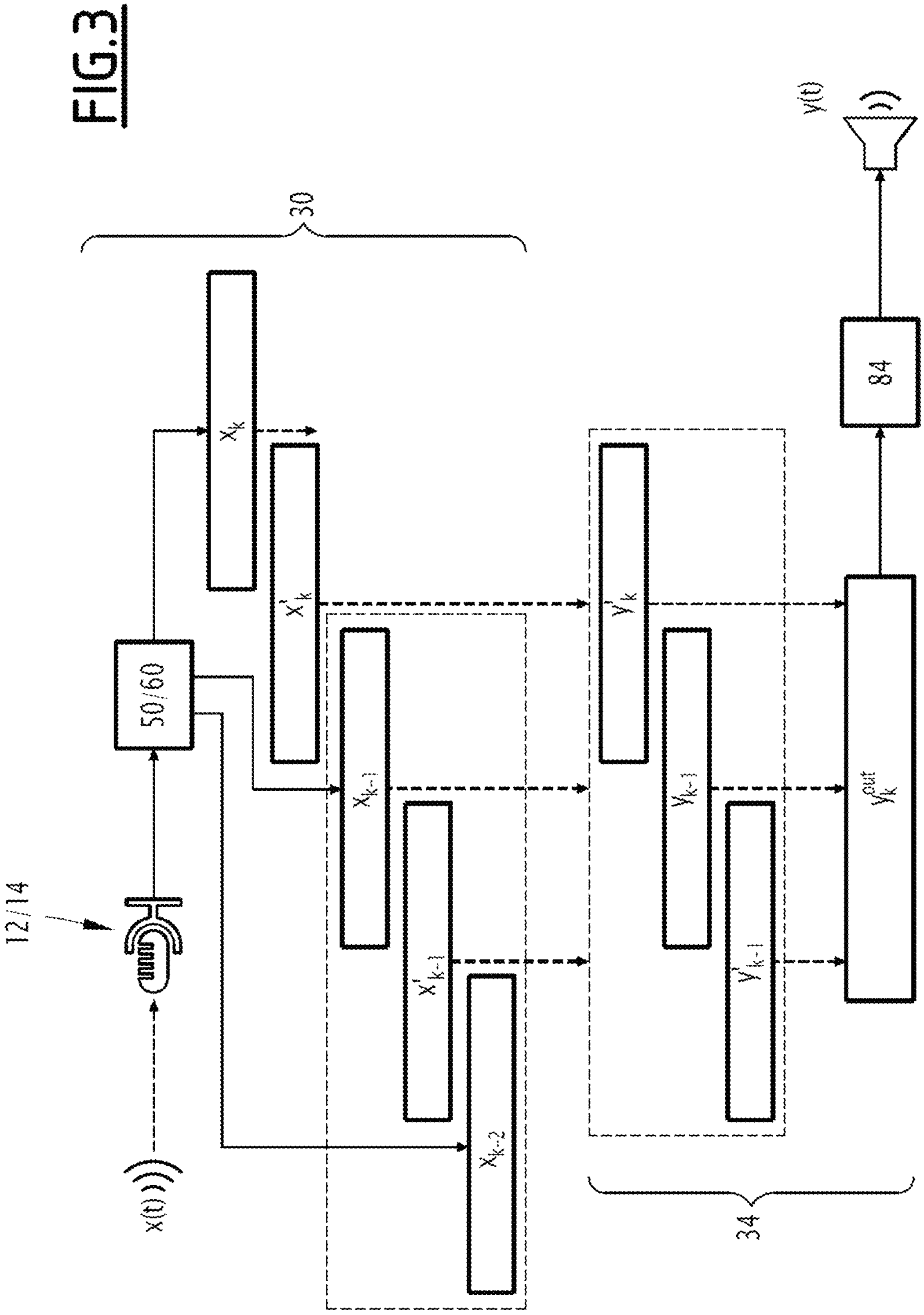
FIG. 3 is a schematic representation of a generation of overlapping segments, as produced by the processing device shown in FIG. 1.

In FIG. 3, the segments which would be obtained by a simple cutting (i.e. without overlapping) of the signal coming from the first analog-to-digital converter 50, and from the second analog-to-digital converter 60 respectively, are denoted by x, whether the first or the second segments are concerned, where i is an index taking the successive values k−2, k−1 and k in the present example. The segments x, which would be obtained by simple cutting and without overlapping are also called physical segments. The other segments, shown in FIG. 3 and illustrating the overlap, are also called overlapped segments and are denoted by $x'_i$, with i equal to k−1 or k in the present example.

In the example shown in FIG. 3, a person skilled in the art would observe that the overlap ratio is substantially equal to 50%, and that segment $x'_{k-1}$ then includes 50% of samples coming from the preceding segment, corresponding to the last half of segment $x_{k-2}$ in present example; and 50% of new samples, corresponding to the first half of the segment $x_{k-1}$ in the present example.

In FIG. 3, the segments obtained after noise reduction by the noise reduction module 34 are denoted by $y_i$ when same result from physical segments $x_i$, and by $y'_i$, respectively, when same result from overlapped segments $x'_i$, with i equal to k−1 or k in the present example.

In the case of a 50% overlap, the output segment $y_k^{out}$ typically satisfies the following equation:

$$y_k^{out} = \frac{1}{2}y'_{k-1}\left[\frac{N}{2}:N\right] + \frac{1}{2}y_{k-1}[0:N] + \frac{1}{2}y'_k\left[0:\frac{N}{2}\right] \quad [6]$$

where N is the number of samples per segment, e.g. equal to 512,
$y_i$ represents a segment obtained after noise reduction from a physical segment $x_i$, and
$y'_i$ represents a segment obtained after noise reduction from an overlapped segment $x'_i$.

The estimation module 32 is configured for estimating noise in the hybrid signal.

When, as an optional addition, the Voice Activity Detection Module (36) is configured for determine the presence of voice or absence of voice in each segment of the hybrid signal, the estimation module 32 is then configured for estimating the noise in the hybrid signal as a function of each segment with a determined absence of voice.

In other words, when the voice activity detection module 36 determines the presence of voice in a given segment, the noise spectrum is not updated. On the other hand, when the voice activity detection module 36 determines the presence of voices in a given segment, the background noise spectrum is updated. Such update of the background noise spectrum is then performed when the segment is not voice and the probability that the segment is noise is high. The robustness of the voice activity detection module 36 will provide all the more accuracy on the estimation and tracking of the noise.

According to such optional add, the estimation module 32 is typically configured for updating the background spectrum $|\tilde{N}_k|$ according to the following equation:

$$\begin{cases} |\widetilde{N_k}| = p \times |\tilde{N}_{k-1}| + (1-p) \times |\tilde{X}_k^{hyb}| \text{ if } DAV = 0 \\ \widetilde{N_k} = |\tilde{N}_{k-1}| \text{ if } DAV = 1 \end{cases} \quad [7]$$

where p is a forgetting factor, e.g. equal to 0.95;

DAV is a voice activity indicator from the voice activity detection module 36, DAV being equal to 1 if the presence of voice is determined, and to 0 otherwise, i.e. if the absence of voice is determined;

$|\tilde{X}_k^{hyb}|$ represents the spectrum of the hybrid signal $\tilde{X}_k^{hyb}$ $|\tilde{N}_{k-1}|$, and $|\tilde{N}_k|$ represent the background spectra for the segment of index k−1, and of index k, respectively.

The noise reduction module 34 is configured for calculating the corrected signal by applying a generalized spectral subtraction algorithm to the hybrid signal and according to the estimated noise.

In the example shown in FIG. 2, the noise reduction module 34 includes a generalized spectral subtraction unit 80, also called SSG unit 80, adapted to implement the generalized spectral subtraction algorithm.

The generalized spectral subtraction algorithm satisfies e.g. the following equation:

$$\begin{cases} |Y_k[m]|^\gamma = |\widetilde{X_k}[m]|^\gamma - \alpha_k[m] \times \delta[m] \times |\widetilde{N_k}[m]|^\gamma \text{ si} \\ \quad |\widetilde{X_k}[m]|^\gamma - \alpha_k[m] \times \delta[m] \times |\widetilde{N_k}[m]|^\gamma \geq \beta |\widetilde{N_k}[m]|^\gamma \\ |Y_k[m]|^\gamma = \beta |\widetilde{N_k}[m]|^\gamma \text{ otherwise} \end{cases} \quad [8]$$

$|\tilde{Y}_k[m]|$ represents the spectrum of the denoised signal for the segment of index k;

$|\widetilde{X_k}[m]|$ represents the spectrum of the hybrid signal for the segment of index k;

$|\widetilde{N_k}[m]|$ represents the background noise spectrum for the segment of index k;

$\alpha_k$ is a noise overestimation coefficient for the segment of index k;

δ represents a correction coefficient;

β represents a noise reinsertion coefficient; and

γ represents a power coefficient, typically equal to 1 or 2.

The generalized spectral subtraction algorithm is calculated, e.g. in amplitude, and the power coefficient γ is then equal to 1; or further in power, and the power coefficient γ is then equal to 2.

In the case of an amplitude calculation of the generalized spectral subtraction, with $\gamma=1$, little musical noise will be produced, but the estimated voice signal could be variably distorted depending on the signal-to-noise ratio. Musical noise is a set of artifacts produced during spectral subtraction, consisting of tones short in time and producing a relatively unpleasant noise.

In the case of a power calculation of the generalized spectral subtraction, with $\gamma=2$, little distortion will be created, but a non-negligible amount of musical noise could be generated.

The noise overestimation coefficient α is preferentially recalculated at each segment of index k and is then denoted by $\alpha_k$. Such coefficient prevents the generation of too much musical noise. To maximize the efficiency thereof, the coefficient is calculated per frequency band and depends on the signal-to-noise ratio on each of the bands.

The $|\widetilde{X_k}[m]|$ spectra and $|\widetilde{N_k}[m]|$ are first cut into sub-spectra denoted by $|\widetilde{X_k^j}[m]|$ and $|\widetilde{N_k^j}[m]|$, where j represents the number of the frequency band. Thus, j values of the signal-to-noise ratio, denoted $SNR_k^j$, each associated with a frequency band of index j, are typically calculated according to the following equation:

$$SNR_k^j = 10 \times \log_{10}\left(\frac{\sum_{m=0}^{N_j} |\widetilde{X_k^j}[m]|^2}{\sum_{m=0}^{N_j} |\widetilde{N_k^j}[m]|^2}\right) \quad [9]$$

where $SNR_k^j$ is the signal-to-noise ratio for the segment of index k and the frequency band of index j, Nj is the number of frequency samples contained in the band of index j;

$|\widetilde{X_k}[m]|$ represents the spectrum of the hybrid signal for the segment of index k; and $|\widetilde{N_k}[m]|$ represents the background noise spectrum for the segment of index k.

Then, for each signal-to-noise ratio value, the noise overestimation coefficient $\alpha_k$ satisfies e.g. the following equation:

$$\begin{cases} \alpha_k^j = 4.75 \text{ if } SNR^j < -5 \text{ dB} \\ \alpha_k^j = 4 - \frac{3}{20} \times SNR_k^j \text{ if } -5 \text{ dB} \leq SNR_k^j \leq 20 \text{ dB} \\ \alpha_k^j = 1 \text{ if } SNR_k^j > 20 \text{ dB} \end{cases} \quad [10]$$

Overall, such calculation of the noise overestimation coefficient α can be used for overestimating the noise when the signal-to-noise ratio is low, and for reducing the introduction of musical noise artifacts.

The noise overestimation coefficient $\alpha_k^j$ is then converted so that same can be reinserted into equation (8), e.g. according to the following equation:

$$\alpha_k[m] = \alpha_k^j \forall m \in [f_j; f_{j+1}] \quad [11]$$

where the interval $[f_j; f_{j+1}]$ corresponds to all frequencies of the $j^{th}$ frequency band. Typically, at each segment, the function $\alpha_k[m]$ will be a piecewise constant function, where each piece will correspond to a frequency band determined by the user.

The correction coefficient δ is a frequency correction coefficient calculated only once, typically at the beginning of the algorithm, and not changing over time.

The coefficient is a simple frequency-dependent prefactor, in order to maximize certain frequency bands in a manner suitable for voice pick-up.

The correction coefficient δ is e.g. a piecewise constant function, satisfying the following equation:

$$\begin{cases} \delta[m] = 1 \forall f[m] < 1000 \text{ Hz} \\ \delta[m] = 2.5 \forall f[m] \in [1000, 2000 [\text{Hz} \\ \delta[m] = 1.5 \forall f[m] \in [2000, 4000 [\text{Hz} \\ \delta[m] = 1 \forall f[m] \geq 4000 \text{ Hz} \end{cases} \quad [12]$$

Given the calculations made with the amplitude spectra, the estimation $|\tilde{Y}_k[m]|^\gamma$ should not be negative because it would have no mathematical meaning. Thus, equation (8) includes a condition for avoiding negative values.

The noise reinsertion coefficient β can be then used for to choosing whether or not to reinsert noise in the case of potentially negative values. When the noise reinsertion coefficient β is chosen to be equal to 0, any subtraction leading to a negative value is replaced by the zero value. On the other hand, for any value greater than 0, noise is reinserted. The above keeps a part of the noise which can be perceived as a comfort noise masking a part of musical noise, if there is any.

The noise reinsertion coefficient β is generally equal to a few percent. The noise reinsertion coefficient β is e.g. substantially equal to 0.05, i.e. a reinsertion of 5% of the background noise into the output signal. Such value is a preset parameter.

It should be noted that the lower or poorer the signal-to-noise ratio, the less efficient the estimation of the denoised signal is and the more the voice will be altered. It is thus interesting to set a higher value of the noise reinsertion coefficient β in the case of a poor signal-to-noise ratio, in order to recapture some harmonics of the voice in the background noise which would otherwise be lost in the spectral subtraction.

In the example shown in FIG. 2, the noise reduction module 34 further includes a frequency-to-time converter 82, connected to the output of the generalized spectral subtraction unit 80, and configured for calculating a time signal from the frequency signal from the SSG unit 80, typically via an inverse Fourier Transform, such as an Inverse Fast Fourier Transform, also known as IFFT.

As indicated above, the frequency domain calculations are performed with the amplitude of the signal spectrum of the segment. The phase of the latter, which remains unmodified, is then reintegrated into the signal before the inverse Fourier Transform for returning to the time domain, e.g. according to the following equation:

$$y_k[n]=\text{IFFT}(|\tilde{Y}_k[m]|\, e^{j\varphi(\widetilde{X_k}[m])})$$

where $y_k[n]$ is the denoised output signal for the segment of index k;

IFFT represents the numerical Inverse Fourier Transform operator;

$|\tilde{Y}_k[m]|$, and $\varphi(\widetilde{X_k}[m])$ represent the amplitude spectrum, and the phase spectrum, respectively, of the noise-suppressed signal for the segment of index k.

In the example shown in FIG. 2, the noise reduction module 34 then includes a digital-to-analog converter 84, connected to the output of the frequency-to-time converter 82 and configured for supplying the corrected signal y(t) in analog form. The denoised signal $y_k^{hyb}$ coming from the frequency-to-time converter 82 is then resynthesized into the corrected signal y(t) via the digital-to-analog converter 84, with synthesis of the overlapped segments, where appropriate, and then delivered at the output of the processing device 20.

The voice activity detection module 36 is configured for determining a presence of voice or an absence of voice in each segment of the hybrid signal.

The voice activity detection module 36 is configured e.g. for determining the presence of voice or the absence of voice from the second signal coming from the bone-mechanically excited transducer; and preferentially only from said second signal, without taking the first signal into account.

The second microphone 14, either bone conduction or with structure-borne noise, is adapted to measure the vibrations of the skin and the face related to the stress of the vocal cords, and can be used for picking up the voiced part of a voice signal while being very insensitive to background noise (which a priori does not make the user's skin vibrate enough to be picked up).

The advantage of using the second bone conduction microphone 14 lies in insensitivity thereof to background noise. Such insensitivity is even greater in the low frequency part of the acquired signal.

Advantageously, the voice activity detection is then carried out after a filtering in the frequency domain (also operating in the time domain) of the structure-borne noise signal. The voice activity detection module 36 is then preferentially configured for determining the presence of voice or the absence of voice from the second filtered signal coming from the second filtered signal $\tilde{X}_k^{ost_{BF}}$ coming from the second filter unit 64.

As an optional addition, the voice activity detection module 36 is configured for calculating an RMS value for each segment of the second signal, i.e. for each second segment; then for determining the presence of voice or the absence of voice as a function of respective RMS values.

The processing is based on the calculation of the signal energy, segment by segment. However, herein, due to the noise-insensitive character of the signal of the filtered structure-borne noise microphone, the energy of the voice will always emerge from the noise floor energy. The calculation of the RMS level then makes it possible to know the energy of the signal.

As is known per se, the root mean square (RMS) value of a periodic signal is the square root of the mean square of said quantity over a given time interval or the square root of the second order moment (or variance) of the signal.

For a time segment $x_k[n]$ of N samples, the calculation of the RMS value is then typically performed via the following equation:

$$RMS_k = \sqrt{\frac{\sum_{n=0}^{N} x_k[n]^2}{N}} \qquad [14]$$

where RMS k is the RMS value for the segment of index k;

$x_k[n]$ is the signal for the segment of index k;

N is the number of samples of said segment.

However, in the frequency domain, using Parseval's identity according to which energy is equal in the frequency and time domains, we obtain the following equation:

$$RMS_k = \frac{1}{2N}\sqrt{\sum_{m=-\frac{N}{2}}^{\frac{N}{2}} |\tilde{X}_k[m]|^2} \qquad [15]$$

where $RMS_k$ is the RMS value for the segment of index k;

$|\widetilde{X_k}[m]|$ represents the spectrum of the hybrid signal for the segment of index k; and N is the number of samples of said segment.

The RMS level value is optionally converted to a dBFS value from the following equation:

$$RMS_k^{dB}=20\times\log_{10}(RMS_k) \qquad [16]$$

where $\log_{10}$ is the decimal logarithm, or base 10 logarithm.

The dBFS value is typically between −94 dBFS minimum (in the case of a dynamic resolution of 16 bits) and 0 dBFS maximum (for a constant signal which would be equal to 1).

As yet an optional addition, the voice activity detection module 36 is configured for determining the presence of voice or the absence of voice according to an average value of M last calculated RMS values, also known as smoothed RMS, and/or a variation of RMS value between a current RMS value and a preceding RMS value, also known as the RMS level variation rate, where M is an integer greater than or equal to 1.

According to such optional addition, the voice activity detection module 36 is configured, e.g., for determining the presence of voices if said average value is greater than or equal to a predefined mean threshold A or if said RMS value variation is greater than or equal to a predefined variation threshold B.

The value of the RMS level is likely to vary over time, and to undergo sudden variations when the microphone concerned, in particular the second microphone 14, picks up a significant vibration. The optional addition then improves the accuracy and reduces the errors of the algorithm, with averaging over the last M calculated values of the RMS level (during the last M segments). The above is implemented e.g. via a circular buffer which adds the new calculated RMS value to each new segment, deletes the last $M^{th}$ value and then averages the old value. The smoothed RMS level at the $k^{th}$ segment, denoted by $\overline{RMS_k^{dB}}$, satisfies e.g. the following equation:

$$\overline{RMS_k^{dB}} = \frac{1}{M} \times \sum_{j=0}^{M-1} RMS_{k-j}^{dB} \quad [17]$$

Monitoring the value of $\overline{RMS_k^{dB}}$ over time makes it possible to identify the voice zones when the latter exceeds a certain threshold. Nevertheless, due to the smoothing, such level could exceed the chosen threshold with a slight delay. Advantageously, a second metric related to the RMS level, namely the rate of variation of the RMS level denoted by ARMS k dB, is then calculated so as to better detect the occurrence of the voice, e.g. via the following equation:

$$\Delta RMS_k^{dB} = \frac{\left(\overline{RMS_k^{dB}} - \overline{RMS_{k-1}^{dB}}\right)}{dt} \quad [18]$$

where $\Delta RMS_k^{dB}$ is the rate of variation of the RMS level for the segment of index k;

$\overline{RMS_{k-1}^{dB}}$, $\overline{RMS_k^{dB}}$ respectively, represents the smoothed RMS level for the segment of index k−1, and of index k, respectively;

dt represents a time difference between two successive segments.

The value dt can correspond exactly to the time difference between two successive segments, and the variation of the RMS level will then be expressed in $dB \cdot s^{-1}$, but the latter can take very large values.

In a variant, and for convenience, the value dt is chosen to be equal to 1. Where appropriate, $\Delta RMS_k^{dB}$ is a rate of variation expressed in $dB \cdot segment^{-1}$. Such quantity is relevant because, at the moment when a discussion partner begins to speak, the RMS level increases abruptly, resulting in a positive $\Delta RMS_k^{dB}$ greater than 1 $dB \cdot segment^{-1}$. Since such quantity varies rapidly, same can be used for detecting the voice very quickly, thus preventing missing the beginning of a sentence.

Decision-making for the instantaneous voice activity detection is then defined e.g. by the following equation:

$$\begin{cases} \text{if } \overline{RMS_k^{dB}} \geq A \text{ then } DAV_k = 1 \\ \text{Or if } \Delta RMS_k^{dB} \geq B \text{ then } DAV_k = 1 \\ \text{Otherwise } DAV_k = 0 \end{cases} \quad [19]$$

where $\overline{RMS_k^{dB}}$ is the smoothed RMS level for the segment of index k;

$\Delta RMS_k^{dB}$ is the rate of change of the RMS level for the segment of index k;

$DAV_k$ is a voice activity indicator for the segment of index k, the indicator being equal to 1 if the presence of voice is determined, and 0 otherwise;

A represents the predefined mean threshold and B represents the predefined variation threshold, corresponding to the level thresholds and to the rate of variation, respectively, to be exceeded in order to consider that the segment is spoken.

The threshold values A and B are predefined according to the dynamics of the acoustic apparatus 10, e.g. as a function of the gain of the microphone concerned, in particular of the second microphone 14, etc.

The voice activity detection calculation described hereinabove gives an instantaneous value for each successive segment (whether overlapped or not). Relying only on an instantaneous value can lead to errors, e.g. a micro-silence in the voice could create an unwanted switch to 0 of the voice activity indicator DAV. On the other hand, a very short impulse noise can lead to a voice activity indicator DAV equal to 1 for only one segment, before returning to 0. Depending on the use of the voice activity detection module 36 (with a mode where the channel is open only if DAV=1 e.g.), such behavior could cause unpleasant artifacts. For this reason, the calculation of voice activity detection is advantageously smoothed so as to avoid such artifacts.

The smoothing is carried out e.g. by using an attack time and a release time. When an instantaneous DAV voice activity indicator $DAV_{inst}^k$ is equal to 1 at least as long as the attack time (or equivalent number of segments), then a smooth DAV voice activity indicator $DAV_{smooth}^k$ becomes equal to 1. On the other hand, when the voice activity indicator DAV instant $DAV_{inst}^k$ is equal to 0 at least as long as the release time, then the smoothed voice activity indicator DAV, $DAV_{smooth}^k$ returns to 0. In all other cases, the smoothed voice activity indicator DAV, $DAVs_{mooth}^k$ retains the value same had in the preceding segment. For the implementation of the smoothing, a counter $C_k$ e.g. is used. The modification of the counter $C_k$ is typically governed by Table 1 below, for each current segment of index k, according to the instantaneous voice activity indicator DAV, $DAV_{inst}^k$ and to the value of the counter $C_{k-1}$ at the preceding segment of index k−1:

TABLE 1

| ET | $C_{k-1} \geq 0$ | $C_{k-1} < 0$ |
|---|---|---|
| $DAV_{inst}^k = 0$ | Counter reset: $C_k = 0$ | $C_k = C_{k-1} - 1$ |
| $DAV_{inst}^k = 1$ | $C_k = C_{k-1} + 1$ | Counter reset: $C_k = 0$ |

Decision-making for the smoothed voice activity detection is then defined e.g. by the following equation:

$$\begin{cases} \text{If } C_k > t_{atk} \text{ then } DAV^k_{smooth} = 1 \\ \text{If } C_k < -t_{rel} \text{ then } DAV^k_{smooth} = 0 \\ \text{Otherwise } DAV^k_{smooth} = DAV^{k-1}_{smooth} \end{cases} \quad [20]$$

where smooth $DAV_{smooth}{}^k$ is the smoothed voice activity indicator for the segment of index k, the indicator being equal to 1 if the presence of voice is determined, and 0 otherwise;

$C_k$ is the counter for the segment with index k;

$t_{atk}$ represents the attack time; and $t_{rel}$ represents the release time.

Figure 4:
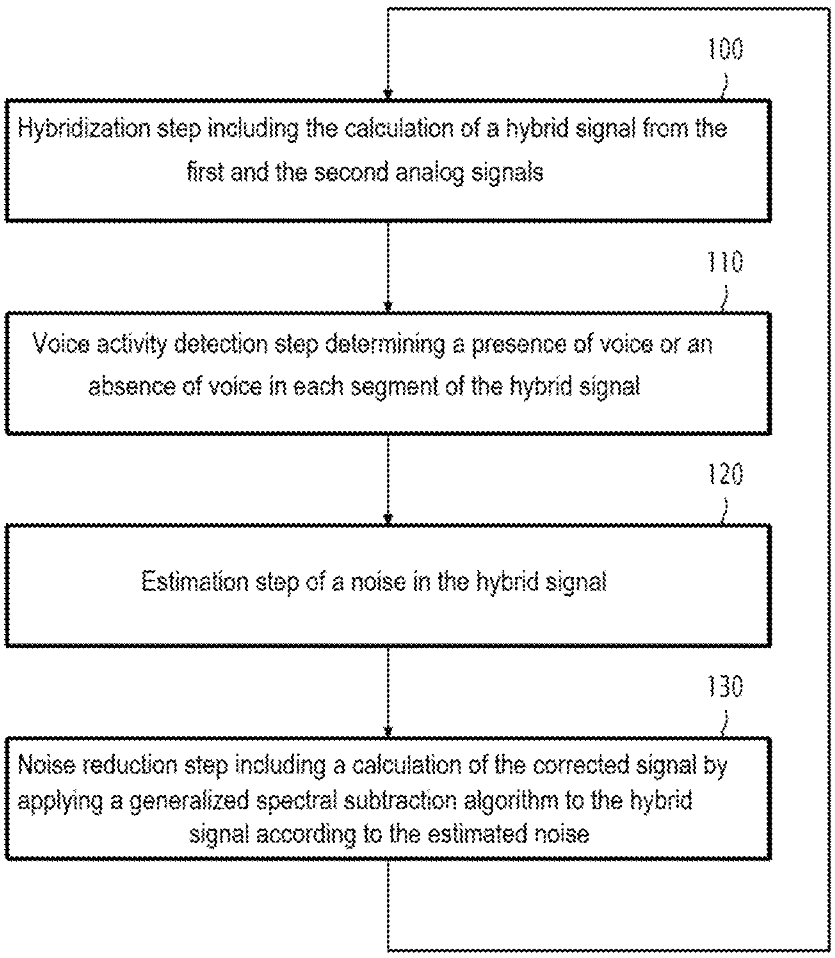
FIG. 4 is a flow chart of a processing method according to the invention, the method being implemented by the processing device shown in FIG. 1.

The operation of the electrical energy conversion system 10, and in particular of the processing device 20 according to the invention, will now be explained with reference to FIG. 4 which represents a flow chart of the processing method according to the invention.

The processing applied to the signal for reducing noise is performed numerically and in real-time. Indeed, when the operator uses the acoustic apparatus 10, the signal has to be denoised and sent to the discussion partner thereof as quickly as possible, seeking to reduce the latency as much as possible, with a desired value of 20 to 30 ms. For qualitative noise reduction, a minimum amount of information to be analyzed has to be available before being able to effectively reduce noise. The processing performed is then a block processing, applied segment by segment to the input signal. As indicated above, each segment typically has a duration of approximately 20 ms. Indeed, over such a period, the voice has a quasi-stationary behavior, whereas the noise has a quasi-stationary behavior over much longer durations.

In order to optimize power consumption, the sampling frequency is preferentially less than 22,050 Hz, leading to a passband in the interval [0; 11,025 Hz]. Consequently, in order to have signal segments of about 20 ms at said sampling frequency, the segments will typically contain 512 samples.

The processing applied to the signal to reduce the noise is mostly carried out in the frequency domain, which is more suitable for noise reduction because the aim is to reduce the level in the frequency bands containing the most noise. However, because of working by frequency segments, problems of discontinuities and inaccuracies could appear from one segment to another, and an overlap of the segments, with an overlap ratio preferentially greater than 50%, ideally equal to 75%, as described hereinabove, is then advantageously implemented to attenuate such problems.

During an initial step 100, the processing device 20 then calculates, via the hybridization module 30 thereof, the hybrid signal from the first and the second analog signals, coming from the first and the second microphones 12, 14, as described hereinabove.

During a subsequent optional step 110, the processing device 20 determines, via the voice activity detection module 36 thereof, a presence of voice or an absence of voice in each segment of the hybrid signal, as described hereinabove.

The processing device 20 then estimates, during the next step 120 and via the estimation module 32 thereof, the noise in the hybrid signal obtained beforehand during the hybridization step 100, as described hereinabove.

When optionally a presence of voice or an absence of voice in each segment of the hybrid signal has been determined during the voice activity detection step 110, the noise is then estimated, during the estimation step 120, in the hybrid signal according to each segment with a determined absence of voice, as described hereinabove.

Finally, during the next step 130, the processing device 20 applies, via the noise reduction module 34 thereof, the generalized spectral subtraction algorithm to the hybrid signal and according to the estimated noise, in order to calculate the corrected signal.

As indicated hereinabove, the processing method is applied in real-time or quasi-real time, with a latency of approximately 20 to 30 ms, and [is] a block processing, applied segment by segment to the input signal.

Thus, at the end of the step 130, the processing method returns to the initial step 100, and more generally, each of the steps 100, optionally 110, 120 and 130, is repeated regularly so as to be implemented for each successive segment of signal.

Figure 5:
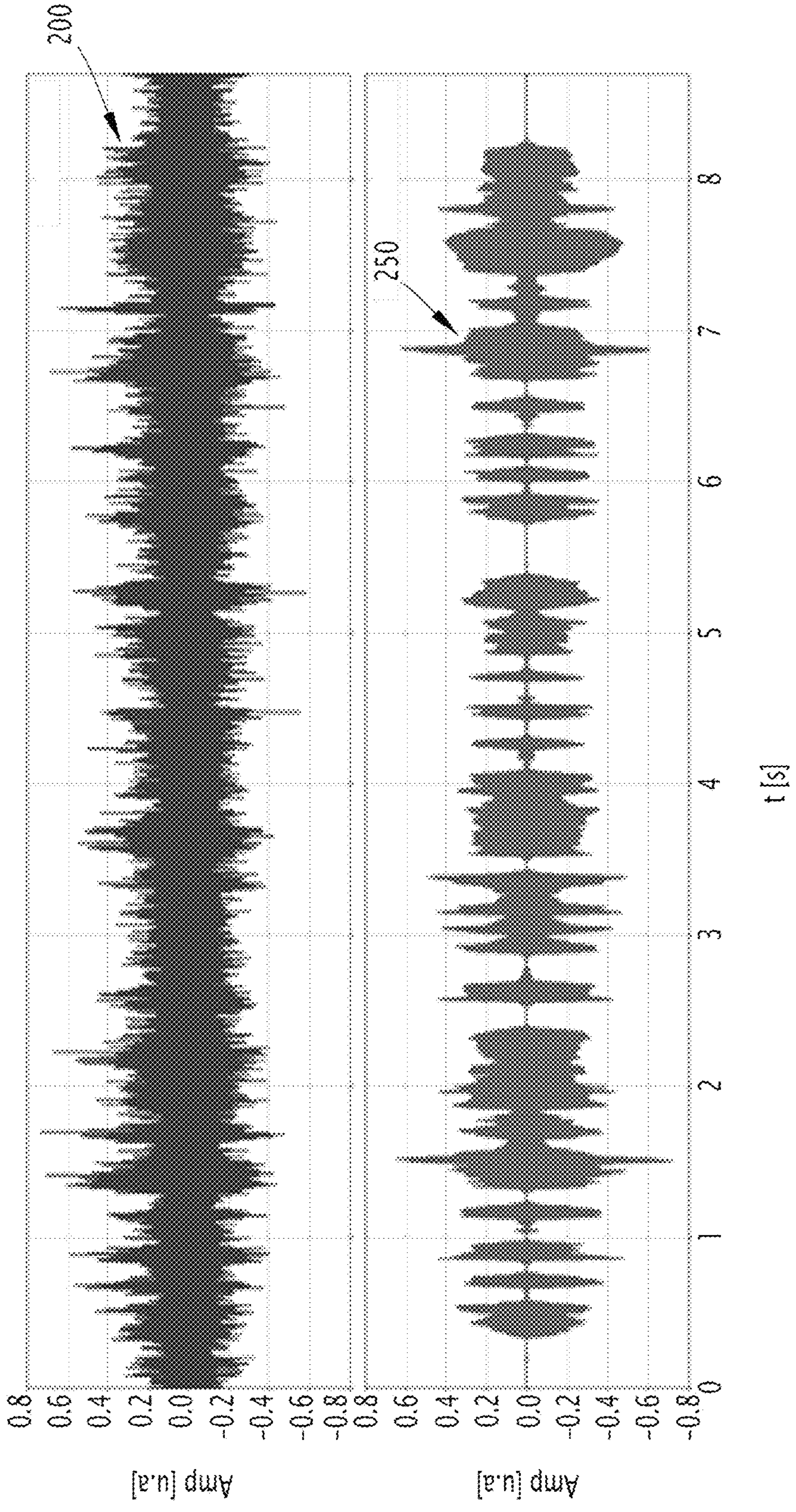
FIG. 5 is a view representing, in the upper part, a noisy voice signal recorded by an air conduction microphone of the prior art; and in the lower part, a hybrid signal obtained with the first and the second microphones, and after noise reduction via the processing device shown in FIG. 1.

In FIG. 5, the curve 200 then represents an example with a signal coming from an air conduction recording of a speaker speaking in a highly noisy environment (vehicle noise at more than 90 db(A). The curve 250 in FIG. 5 shows the same signal after the use of the processing device 20 according to the invention. It can be seen that the noise is greatly attenuated with the processing device 20 according to the invention, while observing that the parts corresponding to the voice are clearly visible and then exhibit good intelligibility.

Figure 6:
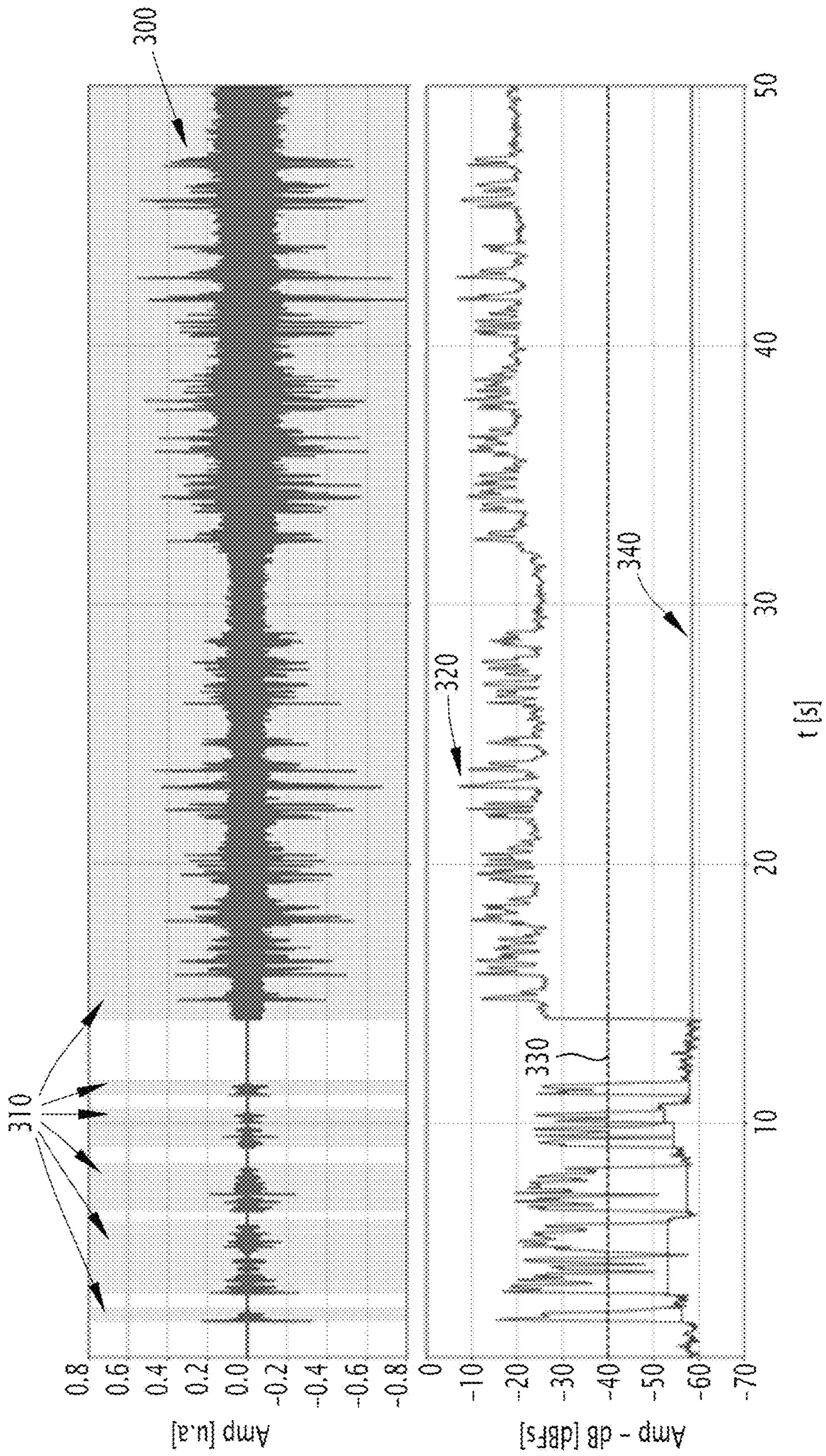
FIG.6 (PRIOR ART)
FIG. 6 is a view with a plurality of curves illustrating a detection of voice activity of the prior art, via an air conduction microphone and for a low detection threshold.

FIG. 6 shows an example of voice activity detection used on a voice signal recorded by a conventional air conduction microphone for different successive phases of noise, from no noise to loud noise. The curve 300 is the time-dependent representation of the signal on which is superimposed the decision taken by the voice activity detection, where the grayed out zones 310 correspond to zones for which a presence of voice has been determined, i.e. DAV=1; the other zones, either not grayed out or blank, corresponding to zones for which an absence of voice has been determined, i.e. DAV=0. In FIG. 6, the curve 320 represents the RMS level of the signal coming from the air conduction microphone over time, with the threshold level to be exceeded for decision making, the threshold level being represented by the horizontal dotted line 330. The curve 340 corresponds to the estimation, by the algorithm, of the RMS level of the background noise in the phases where the voice activity detection has determined an absence of voice.

In the example shown in FIG. 6, the threshold level has been chosen to be deliberately low, with a value substantially equal to −40 dBFS for a good detection of voice in the absence of noise. Indeed, it can be seen that in the phase without noise, for the time period between the time instants 0 s and 15 s, the voice emerges from the noise and the averaged RMS level indeed exceeds the threshold each time the user speaks. The classic voice activity detection is thus correct on the silent part. However, as soon as the noise has a moderate level, the averaged RMS level is systematically above the set threshold, since same is too low. As a result, the above leads to an erroneous determination of the presence of voice during the entire sequence of the signal: the voice activity detection becomes inoperative, as same cannot separate the contribution of noise from the contribution of voice. Since the voice activity detection gives an always positive response, the estimate of the RMS level of the noise is thereby also totally distorted and remains at the value taken during the absence of noise.

Figure 7:
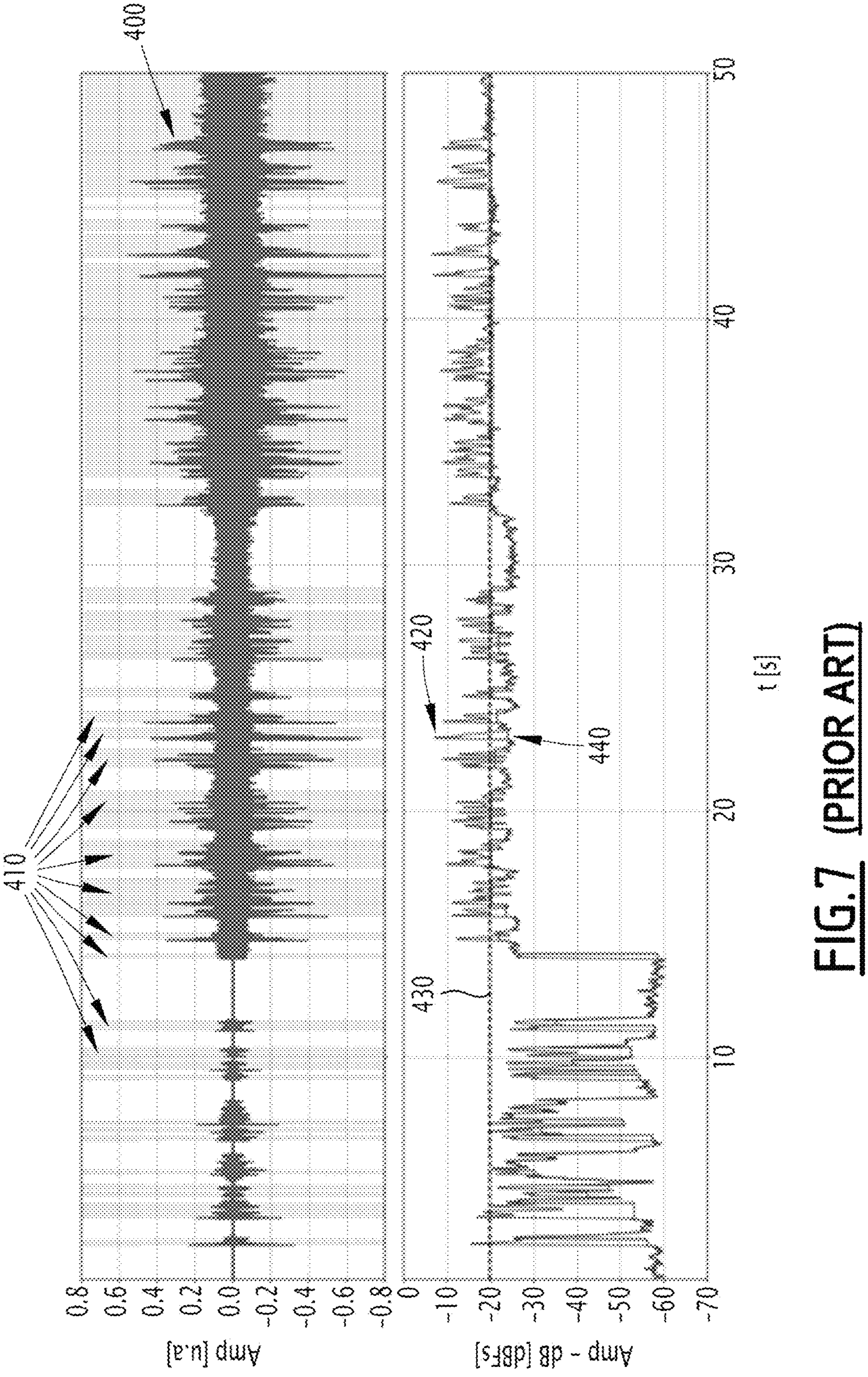
FIG.7 (PRIOR ART)
FIG. 7 is a view similar to the view shown in FIG. 6, for a higher detection threshold.

FIG. 7 is analogous to FIG. 6, except that the detection threshold has been raised to a value substantially equal to −20 dBFS. The curve 400 is the time-dependent representation of the signal on which is superimposed the decision taken by the voice activity detection, where the grayed out zones 410 correspond to zones for which a presence of voice has been determined, i.e. DAV=1; the other zones, either not grayed out or blank, corresponding to zones for which an absence of voice has been determined, i.e. DAV=0. In FIG. 7, the curve 420 represents the RMS level of the signal coming from the air conduction microphone over time, with the threshold level to be exceeded for decision making, the threshold level being represented by the horizontal dotted line 430. The curve 440 corresponds to the estimation, by the algorithm, of the RMS level of the background noise in the phases where the voice activity detection has determined an absence of voice.

In FIG. 7, a person skilled in the art will then observe that the voice detection in the moderate noise part, between the time instants 15 s and 30 s approximately, is rather correct. The RMS level, at the moments when there is voice, makes it possible to distinguish the latter from the noise. However, as soon as the noise level is further increased, the threshold no longer makes it possible to distinguish the voice from the noise, and many zones are considered as exclusively spoken, between the time instants 34 s and 42 s e.g., while there are actually moments of absence of voices in said zones. Worse still, due to the too high threshold, in the part without noise, the activity detection of the prior art mixes up voice with noise a plurality of times and misses or cuts certain detections too soon. Thereby, the voice signal is seriously deteriorated. Moreover, the above totally distorts the estimate of the noise level, corresponding to the curve 440 which is artificially increased when the person speaks.

Finally, through the two examples shown in FIGS. 6 and 7 illustrating the prior art, the person skilled in the art will understand that the threshold should vary automatically (low for the silence phases, higher for the noise phases) for obtaining good results from the voice activity detection of the prior art using an air conduction microphone. Indeed, with conventional voice activity detection, a fixed threshold setting cannot correspond correctly to both a noisy environment and a quiet environment, particularly because of the high sensitivity of air conduction microphones to the environment.

Figure 8:
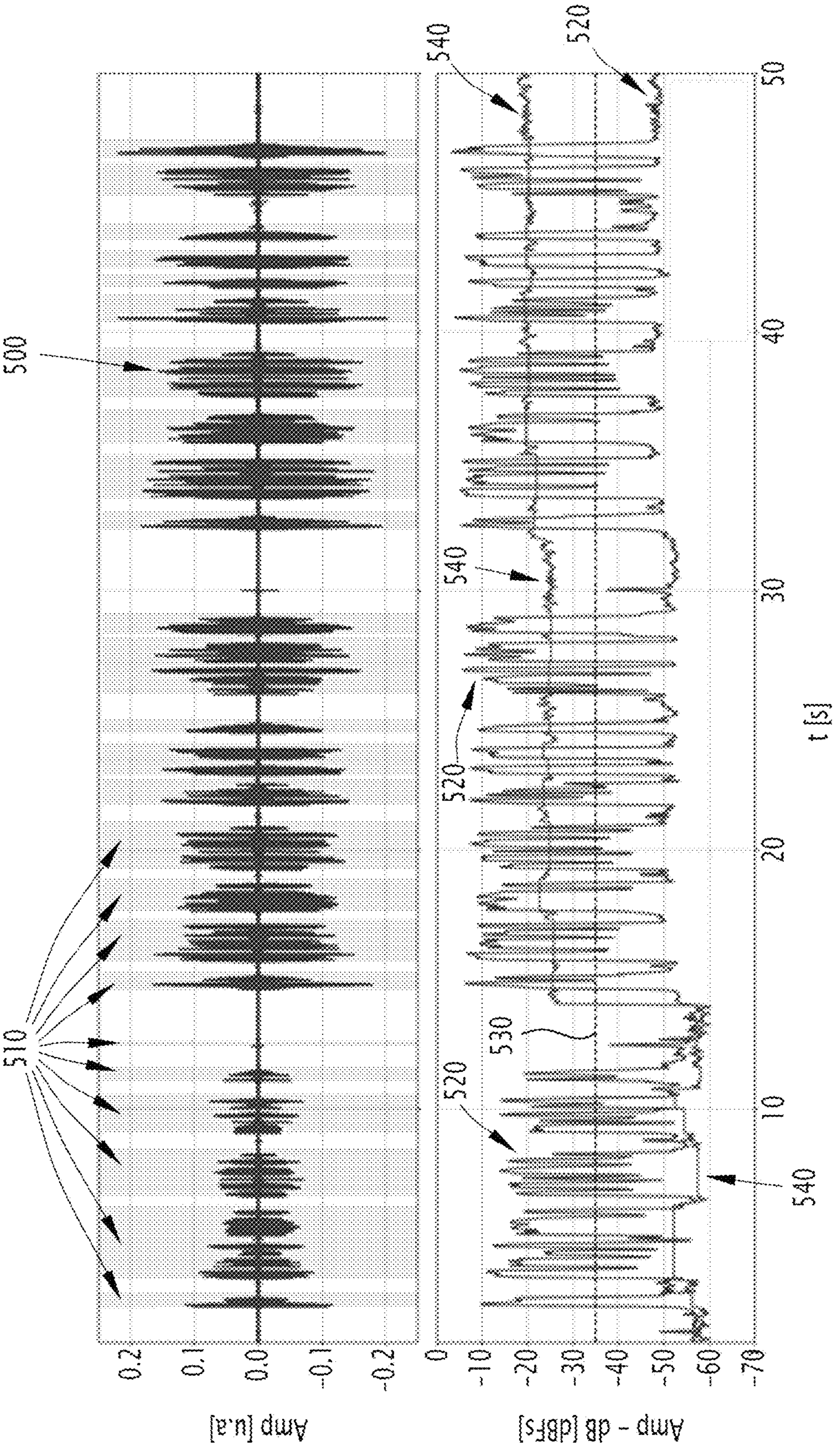
FIG. 8 is a view similar to the views shown in FIGS. 6 and 7, illustrating a detection of voice activity according to the invention, via a bone conduction microphone.

FIG. 8 illustrates the use of the processing device 20 according to the invention, and in particular the voice activity detection according to the invention from the second signal coming from the bone-conduction, mechanical excitation transducer, on the same recording as the recording used for the examples shown in FIGS. 6 and 7, but with the second bone conduction microphone 14, and then the use of the generalized spectral subtraction algorithm.

The curve 500 is the time-dependent representation of the signal on which is superimposed the decision taken by the voice activity detection, where the grayed out zones 510 correspond to zones for which a presence of voice has been determined, i.e. DAV=1; the other zones, either not grayed out or blank, corresponding to zones for which an absence of voice has been determined, i.e. DAV=0. In FIG. 8, the curve 520 represents the RMS level of the signal coming from the second bone conduction microphone 14 over time, with the threshold level to be exceeded for decision making, the threshold level being represented by the horizontal dotted line 530. The curve 540 corresponds to the estimation, by the algorithm, of the RMS level of the background noise in the phases where the voice activity detection has determined an absence of voice.

With the processing device 20 according to the invention, a first striking element is that the waveform associated with the filtered bone conduction recording (low-pass filter) is much less marked by noise. Whatever the noise level, the voice emerges very easily therefrom. Such effect is even more visible on the representation of the RMS level of the filtered signal over time as there is a difference of almost 40 dB between the voice-related peaks and the background noise. Hence, the choice of the threshold value becomes easier and provides greater flexibility than with the processing device of the prior art. The threshold has e.g. been arbitrarily set herein at −35 dBFS, while observing that a threshold value at −25 dBFS or −45 dBFS would have given similar results. Due to such natural emergence, the generalized spectral subtraction algorithm is particularly effective and identifies the voice as well in three different noise zones.

Finally, due to the performance thereof, the processing device 20 according to the invention is adapted to accurately detect the time periods in the presence of noise alone. In such way, the averaging of the RMS level of the air conduction microphone only at the moments when DAV=0 can be used for obtaining a good estimation of the level of the background noise, represented by the curve 540.

The results clearly show the advantage of the processing device 20 according to the invention because of the significant gain in performance and in calculation cost, compared with the processing device of the prior art.

Thus, when the user is in a noisy environment, and uses the acoustic apparatus 10, e.g. with a radio, for communicating with a remote correspondent, the signal sent to the correspondent, without implementing the invention, would be altered by unwanted acquisition of a portion of background noise. The electronic processing device 20 according to the invention can be used for reducing the presence of the background noise in the signal sent to the correspondent, and in particular for filtering the voice from the noise, in order to aim to send only the effective signal to the correspondent, via the radio.

The results obtained with the electronic processing device 20 according to the invention, in particular the results presented above with reference to FIGS. 5 and 8, also show the synergy between the voice activity device based on acquiring a signal via the second bone conduction microphone 14 and the reduction of noise via the generalized spectral subtraction algorithm. The synergy leads to a very good accuracy in terms of voice activity, which allows the noise spectrum to be updated efficiently. The results obtained with the generalized spectral subtraction algorithm are then improved, while using a limited number of calculation operations.

It will thus be understood that the electronic processing device 20, and the associated processing method, can be used for further improving the reduction of noise in the signal delivered at the output of the acoustic apparatus 10.

The invention claimed is:

1. An electronic processing device for an acoustic apparatus, the acoustic apparatus comprising a first microphone including an electroacoustic transducer adapted to receive acoustic sound waves of a sound signal from a user's vocal chords and to transform said acoustic waves into a first analog signal; and a second microphone including a bone-mechanically excited transducer adapted to receive vibratory oscillations of said sound signal by bone conduction and to transform said vibratory oscillations into a second analog signal, the electronic processing device being configured for being connected to the first and second microphones, to receive as input, the first and second analog signals and to output a corrected signal, the electronic processing device comprising:

a hybridization module configured for calculating a hybrid signal from the first and second analog signals;

an estimation module connected to the hybridization module and configured for estimating noise in the hybrid signal; and a noise reduction module connected to the hybridization module and to the estimation module, the noise reduction module being configured for calculating the corrected signal by applying a generalized spectral subtraction algorithm to the hybrid signal and according to the estimated noise.

2. The device according to claim 1, wherein the hybrid signal includes a plurality of successive segments, and the device further comprises a voice activity detection module connected to the hybridization module and configured for determining a presence of voice or an absence of voice in each segment of the hybrid signal; the estimation module then being configured for estimating the noise in the hybrid signal according to each segment with a determined absence of voice.

3. The device according to claim 2, wherein the voice activity detection module is configured for determining the presence of voice or the absence of voice from the second signal of the bone-mechanically excited transducer.

4. The device according to claim 3, wherein the voice activity detection module is configured for determining the presence of voice or the absence of voice only from the second signal, without taking into account the first signal.

5. The device according to claim 3, wherein the second signal includes a plurality of successive segments, and the voice activity detection module is configured for calculating an RMS value for each segment of the second signal, and then for determining the presence of voice or absence of voice based on respective RMS value(s).

6. The device according to claim 4, wherein the voice activity detection module is configured for determining the presence of voice or the absence of voice according to an average value of M last calculated RMS value(s) and/or according to a change in RMS value between a current RMS value and a preceding RMS value, M being an integer greater than or equal to 1.

7. The device according to claim 6, wherein the voice activity detection module is configured for determining the presence of voice if said average value is greater than or equal to a predefined average threshold or if said RMS value variation is greater than or equal to a predefined variation threshold.

8. The device according to claim 1, wherein the hybridization module is configured for converting the first analog signal into a first digital signal, as the first analog signal is received, and for generating successive first segments from the first digital signal, each new first generated segment including samples of a preceding first segment and new samples of the first digital signal; and the hybridization module is configured for converting the second analog signal into a second digital signal as the second analog signal is received, and for generating successive second segments from the second digital signal, each new second generated segment including samples of a preceding second segment and new samples of the second digital signal;

hybrid segments of the hybrid signal being then progressively calculated from the first and second generated segments; the corrected signal is then calculated from said hybrid segments.

9. The device according to claim 1, wherein the hybridization module is configured for obtaining a first filtered signal by applying to the first signal a first filter associated with a first frequency range; for obtaining a second filtered signal by applying to the second signal a second filter associated with a second frequency range; then for calculating the hybrid signal by summing the first filtered signal and the second filtered signal, the second frequency range being distinct from the first frequency range.

10. The device according to claim 9, wherein the first frequency range includes frequencies higher than the ones of the second frequency range.

11. The device according to claim 10, wherein the first and the second frequency ranges are disjoint.

12. An acoustic apparatus comprising:

a first microphone including an electroacoustic transducer adapted to receive acoustic sound waves of a sound signal from a user's vocal chords and to transform said acoustic waves into a first analog signal;

a second microphone including a bone-mechanically excited transducer adapted to receive vibratory oscillations of said sound signal by bone conduction and to transform said vibratory oscillations into a second analog signal;

an electronic processing device connected to the first and second microphones, the electronic processing device being configured for receiving the first and second analog signals as inputs and then for delivering a corrected signal as output;

wherein the electronic processing device is according to claim 1.

13. A processing method, the method being implemented by an electronic processing device connected to first and second microphones, the first microphone including an electroacoustic transducer adapted to receive acoustic sound waves of a sound signal from a user's vocal chords and to convert said acoustic waves into a first analog signal; and the second microphone including a bone-mechanically excited transducer adapted to receive vibratory oscillations of said sound signal by bone conduction and to transform said vibratory oscillations into a second analog signal, the electronic processing device being configured for receiving as inputs the first and second analog signals and for delivering as output a corrected signal, the processing method comprising:

a hybridization step including the calculation of a hybrid signal from the first and second analog signals;

a step of estimating noise in the hybrid signal; and a noise reduction step including the calculation of the corrected signal by applying a generalized spectral subtraction algorithm to the hybrid signal and according to the estimated noise.

14. A non-transitory computer-readable medium including a computer program comprising software instructions which, when executed by a computer, implement a method according to claim 13.

* * * * *